Nov. 12, 1929.  I. CAPLAN  1,735,562
SIGNAL DEVICE
Filed May 21, 1928
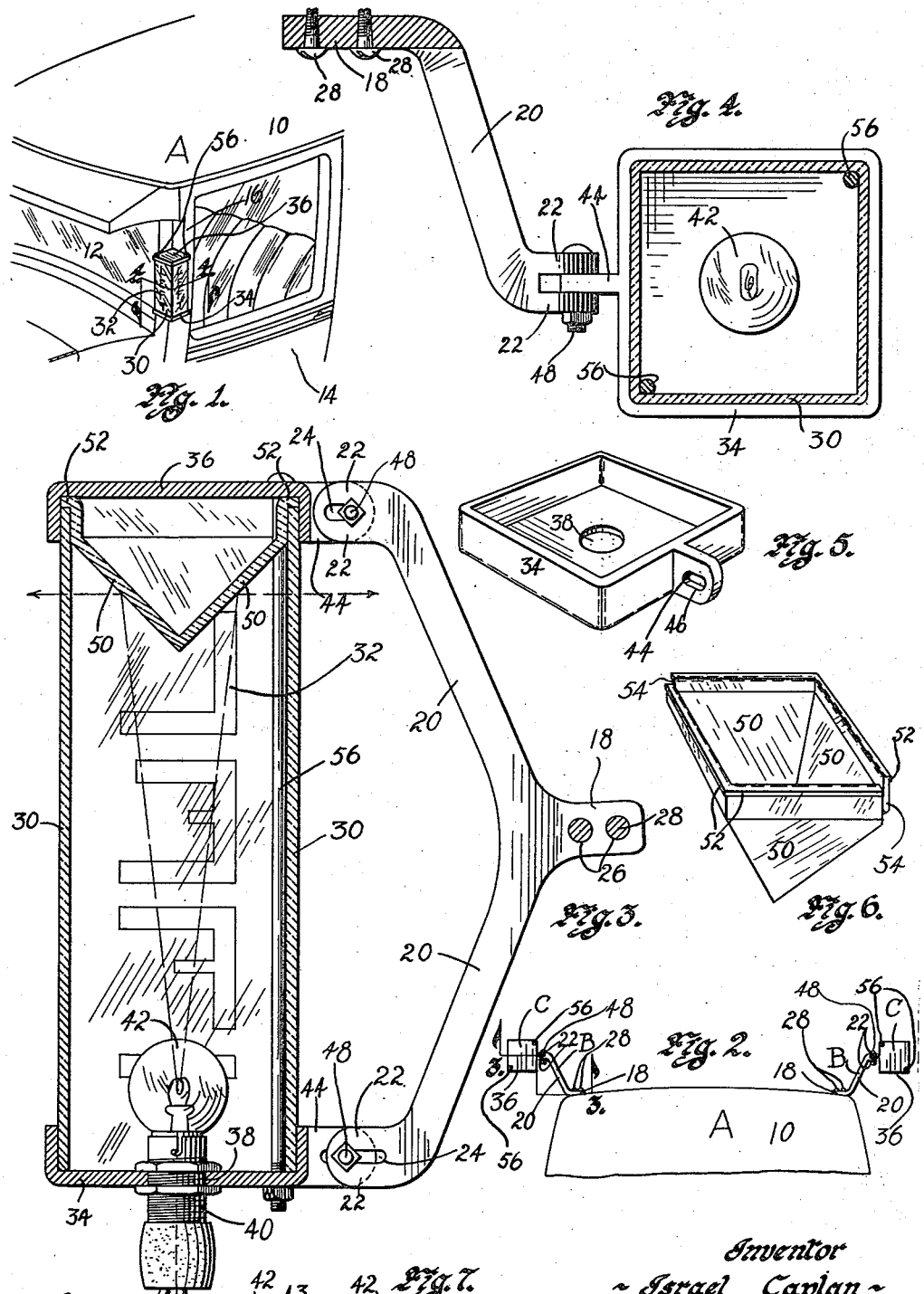
Inventor
~ Israel Caplan ~
by Baur, Freeman & Sinclair
Attorneys
Witness
Vincent Brown.

Patented Nov. 12, 1929

1,735,562

UNITED STATES PATENT OFFICE

ISRAEL CAPLAN, OF DES MOINES, IOWA

SIGNAL DEVICE

Application filed May 21, 1928. Serial No. 279,324.

The object of my invention is to provide a signal device of simple, durable and comparatively inexpensive construction.

A further object of my invention is to provide a signal device in which a signal casing is used of novel construction whereby it is very simple to manufacture and assemble and is readily adapted for being supported relative to an automobile.

More particularly it is my object to provide a signal casing in the form of a tubular transparent member such as square glass tubing to form part of the casing and to provide end caps adapted to fit against the ends of the piece of tubing and be held thereagainst by tie bolts extending through the tube and connecting the end caps together.

A further object is to provide in connection with my signal device, a reflector of pyramid shape which is inverted adjacent the top of the casing for the purpose of diffusing the light coming from the electric bulb situated in the bottom of the casing so that the signal device is readily visible.

Still a further object is to provide an adjustable mounting bracket for my device, the bracket being of such shape that the signal device is supported relative to an automobile so that it can easily be seen from all directions.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a perspective view of the left front corner of an automobile illustrating one of my signal devices attached thereto.

Figure 2 is a plan view of the front portion of the automobile illustrating two of the signal devices secured thereto.

Figure 3 is an enlarged sectional view on the line 3—3 of Figure 2.

Figure 4 is an enlarged sectional view on the line 4—4 of Figure 1.

Figure 5 is a perspective view of one of the end caps of the device.

Figure 6 is a perspective view of the reflector device used in connection with my structure; and Figure 7 is an electrical diagrammatic view, showing the relationship of my signal device to a source of electric current and controlling means for causing them to light.

On the accompanying drawings, I have used the reference character A to indicate generally an automobile. I have illustrated the top 10, windshield 12, door 14 and one of the frame posts 16 of the automobile. A frame post 16 is positioned on each side of the windshield 12 and to these posts I connect supporting brackets B on which are mounted the signal devices C. The brackets B are made right and left hand for the right and left sides of the automobile.

Each bracket B includes a foot portion 18 and diverging arms 20. The arms 20 terminate in bifurcated portions 22 which are provided with slots 24. The foot portion 18 is provided with openings 26 through which screws 28 or other suitable fastening devices may be inserted for the purpose of supporting the brackets 20 on the frame posts 16 of the automobile.

Each signal device C consists of a transparent tubular shaped member 30 which is preferably square in cross section. Opaque indicating characters 32 are painted or otherwise secured to the four sides of the casing 30. The indicating characters on the left hand signal device C will read "Left" and on the right one will read "Right".

End caps 34 and 36 are provided for the ends of the tubular casing 30. These caps are formed either of sheet metal stampings or cast metal and consist of plate portions having peripheral flanges to fit around the outside of the tubular member 30. The end cap 34 is provided with an opening 38 adapted to receive a connector socket for supporting an electric light globe 42 on the inside of the casing 30 adjacent the bottom thereof.

Electric wires 43 extend from the connector 40 and are included in the signal circuit provided for my device and which will hereinafter be described. Each of the caps 34 and 36 is provided with an ear 44. Each ear 44 is slotted as indicated at 46. The ears 44 are adapted to extend between the bifurcated end portions 22 of the brackets B. Clamping bolts 48 are then utilized for clamping the ears 44 between the bifurcated portions 22. Due to the slotted connection provided by the slots 24 and 46, the outer ends of the bracket B may be adjusted to a slanting position with relation to the signal device C. The purpose of this construction is so that in the event the frame post 16 of the automobile is on a slant, the bracket B may be aligned with it and the signal device C then adjusted to a vertical position.

To increase the amount of light radiated from the signal device C, I provide a reflector member 50. The reflector member 50 is pyramid in shape and is made of glass or similar transparent material and silvered on the inside for forming a reflecting surface.

A flange 52 is provided on the upper end of the reflector 50 which is adapted to be positioned between the upper end of the tubular casing 30 and the end cap 36. In this manner the flange 52 serves to support the reflector 50. Notches 54 are provided at two of the corners of the reflector 50.

The entire signal casing C consisting of the casing 30, end members 34 and 36 and reflector 50 are held in assembled position by tie bolts 56 extending through the casing 30 and connected with the end members 34 and 36. The bolts 56 extend through the notches 54 cut in the corners of the reflector 50.

I have shown two of the bolts 56, but one at each corner may be provided if found desirable. By shaping the brackets B as indicated in plan view in Figure 2, the signal devices C are set out from the sides of the car A and in front of the windshield thereof so that they may be seen from all four directions. From the description of my invention, it will be seen that I have provided a very simple construction for a signal device and one which is easily assembled.

In Figure 7, I have shown an electrical diagram in which the light globes 42 in the left and right signal devices C are selectively illuminated by push buttons 58 which may be placed on the dash board or steering wheel of the automobile. The storage battery 60 of the automobile is utilized for supplying current to the signal lights.

To prevent chipping the glass casing 30 and the flange 52 of the reflector 50 during assembly of the devices, felt or rubber packing strips may be inserted between the casing, reflector and end caps.

It is obvious that various changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A signal device comprising a transparent casing having end caps provided with slotted ears, a supporting bracket having slotted ends of forked construction for receiving said slotted ears and clamping bolts extending through said slotted ears and ends whereby the bracket may be set at an angle and the casing maintained in upright position.

2. In a signal casing and support therefor, a transparent tubular casing having end caps, means to retain said end caps on said casing, a slotted ear on each of said end caps, a Y shaped support having its central portion adapted to be secured to an automobile body and having forked and slotted ends, said ears being received in said forked ends and clamping bolts extending through the slots of said ears and said forked ends.

Des Moines, Iowa, April 27, 1928.

ISRAEL CAPLAN.